(12) United States Patent
Rueb et al.

(10) Patent No.: US 12,179,370 B2
(45) Date of Patent: Dec. 31, 2024

(54) METHOD FOR OPERATING A MANIPULATOR

(71) Applicant: Robert Bosch GmbH, Stuttgart (DE)

(72) Inventors: Andreas Rueb, Tamm (DE); David Geissler, Sandberg (DE); Efim Kuhn, Grettstadt (DE); Fan Yang, Blaustein (DE); Markus Groganz, Wasserlosen (DE); Michael Danzberger, Zeilitzheim (DE); Peter Schlegel, Obernzenn (DE); Sebastian Siedler, Escherndorf (DE); Thomas Dickmann, Landsberg (DE); Tobias Wolf, Elfershausen (DE)

(73) Assignee: Robert Bosch GmbH, Stuttgart (DE)

( * ) Notice: Subject to any disclaimer, the term of this patent is extended or adjusted under 35 U.S.C. 154(b) by 274 days.

(21) Appl. No.: 17/806,204

(22) Filed: Jun. 9, 2022

(65) Prior Publication Data
US 2022/0395982 A1 Dec. 15, 2022

(30) Foreign Application Priority Data
Jun. 10, 2021 (DE) .................. 10 2021 205 856.6

(51) Int. Cl.
*G06F 17/00* (2019.01)
*B25J 9/16* (2006.01)
*B25J 13/08* (2006.01)
*B25J 17/02* (2006.01)

(52) U.S. Cl.
CPC ........... *B25J 9/1692* (2013.01); *B25J 13/088* (2013.01); *B25J 17/0208* (2013.01)

(58) Field of Classification Search
CPC .... B25J 9/1692; B25J 13/088; B25J 17/0208; B25J 9/1679; B25J 9/12; B25J 9/1694
USPC ......................................................... 700/254
See application file for complete search history.

(56) References Cited

U.S. PATENT DOCUMENTS

| | | | | |
|---|---|---|---|---|
| 9,156,160 B2 * | 10/2015 | Nagai | ................... | B25J 9/1682 |
| 2014/0277715 A1 * | 9/2014 | Nagai | ................... | B25J 9/1692 |
| | | | | 700/254 |
| 2014/0277722 A1 * | 9/2014 | Nagai | ................... | B25J 9/1692 |
| | | | | 700/254 |
| 2018/0283842 A1 * | 10/2018 | Rueb | ..................... | G01B 7/012 |
| 2022/0314442 A1 * | 10/2022 | Naderer | .............. | B25J 17/0208 |
| 2022/0366748 A1 * | 11/2022 | Kuhn | ...................... | B25J 19/00 |

FOREIGN PATENT DOCUMENTS

| | | | | |
|---|---|---|---|---|
| CN | 107848121 B * | 1/2021 | ......... | B25J 17/0225 |
| DE | 102015214003 A1 * | 1/2017 | ......... | B25J 17/0225 |
| DE | 10 2015 219 332 A1 | 4/2017 | | |
| DE | 102019115562 A1 * | 12/2020 | ............ | B24B 23/02 |
| DE | 10 2021 204 730.0 | 11/2022 | | |

(Continued)

OTHER PUBLICATIONS

What are End Effectors_Types of End Effectors in Robotics and Applications. pdf (Year: 2024).*

*Primary Examiner* — Ronnie M Mancho
(74) *Attorney, Agent, or Firm* — Maginot, Moore & Beck LLP

(57) ABSTRACT

A method is for operating a manipulator that has a movement device, a compensating device, and a tool. In the method, a relative displacement of the compensating device, with respect to a target position, is sensed during setting-up and is taken into account in a subsequent control of the manipulator.

12 Claims, 4 Drawing Sheets

(56) References Cited

FOREIGN PATENT DOCUMENTS

| DE | 102021204730 A1 | * | 11/2022 | ............... E05B 9/04 |
| DE | 102021205856 B4 | * | 4/2023 | ............ B25J 13/088 |
| WO | WO-2021252224 A1 | * | 12/2021 | ............. B23Q 17/20 |

* cited by examiner

METHOD FOR OPERATING A MANIPULATOR

This application claims priority under 35 U.S.C. § 119 to patent application no. DE 10 2021 205 856.6, filed on Jun. 10, 2021 in Germany, the disclosure of which is incorporated herein by reference in its entirety.

The disclosure relates to a method for operating a manipulator that has a movement device embodied, for example, as an articulated-arm robot or as a Cartesian robot.

BACKGROUND

Such manipulators are used, for example, for assembly tasks, for tool handling, palletising, deburring, plastic milling, spot welding, laser welding or for painting or coating. The printed publication DE 10 2015 214 003 A1 describes a manipulator embodied with an articulated-arm robot (also called jointed-arm robot), which is embodied with serial kinematics, in which a plurality of jointed arms, which may be embodied, for example, with rotating main axes, are operatively connected to each other. Located on the final jointed arm of the serial jointed-arm arrangement of the articulated-arm robot is a robot flange, which is connected via a compensating device to a tool-side flange to which a tool, for example a gripper, a probe or a painting tool, can be attached. Such robots have a very high positioning accuracy. However, in particular in the case of pick-and-place tasks, faults can then occur due to unknown or inaccurate positioning of the workpiece, or due to the accumulation of positional deviations over time resulting from the repetition accuracy of such robots. In order to compensate such positional tolerances, the compensating device according to DE 10 2015 214 003 A1 is embodied in such a manner as to allow a relative shift between the tool flange and the robot flange to compensate the positional tolerances. In this case, a relative movement of the tool flange and robot flange is allowed in a plurality of degrees of freedom of movement, these being able to be realised both as translational degrees of freedom and as rotational degrees of freedom.

DE 10 2015 219 332 A1 describes a manipulator in which the relative position between the robot flange and the tool flange can be sensed via a tactile position measuring means.

Another manipulator is known from DE 10 2015 214 003 A1. If a relative shift of the tool flange and the robot flange is not wanted, for example due to an exact workpiece positioning, the compensating device in a first operating state can be locked in a basic position/zero position, while in a second operating state the aforementioned relative shift between the robot flange and the tool flange is permitted, the two components preferably being biased in the direction of the zero position via a spring arrangement.

In the post-published DE 10 2021 204 730.0, the above-mentioned manipulators are further developed in such a manner that the relative position is displayed optically via lamps when the compensating device is shifted out of its, preferably spring-biased, basic position, such that the deflection state and the operating state of the compensating device can be identified very rapidly by the user.

SUMMARY

The disclosure is based on the object of creating a method for operating a manipulator, by means of which handling/manipulation of items that are not precisely positioned is simplified.

The method according to the disclosure is designed for operating a manipulator that comprises at least one movement device, for example an articulated-arm robot (jointed-arm robot) or Cartesian robot. This movement device is provided with a compensating device which, as per the embodiments described above, allows a relative shift of a first part (robot flange) with respect to a second part (tool flange). The latter carries a tool, which may be embodied, for example, as a gripper, welding tongs, a probe or a painting tool.

In this disclosure, the terms "robot flange" and "tool flange" are understood to mean an arrangement which, on the one hand, is connected to the movement device (articulated-arm robot, Cartesian robot, other handling device) and thus realizes the interface to this movement device and with which, on the other hand, any tool, for example a probe, a gripper, welding tongs or a painting tool, can be attached via a tool-side interface.

This movement device is embodied in such a manner that the tool (also called end effector) is movable in at least two first degrees of freedom.

According to the disclosure, the compensating device is designed to be switchable between a first and a second operating state, in the first operating state the robot flange being rigidly connected to the tool flange, while in the second operating state a zero position is defined between the robot flange and the tool flange. In the second operating state, the tool flange is resiliently connected to the robot flange in at least two second degrees of freedom, the two components being biased in the direction of the zero position via the compensating device.

The manipulator according to the disclosure furthermore has a control unit via which the components described above can be controlled, or via which any positions sensed are evaluated.

According to the method according to the disclosure, the second operating state permitting a relative shift of the robot flange and of the tool flange is first set, such that these two components can be tilted, rotated or shifted out of the, preferably spring-biased, zero position. Via the control unit, the tool (end effector) is then moved by means of the movement device along the predetermined movement path, preferably in the direction of a target position, the tool (in the case of incorrect positioning of the item) contacts the item to be manipulated or a carrier receiving it, such that the compensating device is accordingly moved out of the zero position, such that the robot flange and the tool flange are tilted, rotated or shifted relative to each other.

This relative displacement is sensed via the position measuring means, it being possible to measure not necessarily only the displacement path, but also the force required for shifting.

After this relative displacement, the movement device is controlled via the control unit in such a manner that the tool is displaced in the direction opposite to the path of movement described above until it just no longer touches the item to be manipulated and the compensating device is correspondingly moved back into the, preferably spring-biased, zero position.

In the case in which the item to be manipulated is located on a carrier, for example a pallet or the like, a plurality of such setting-up operations may be performed in order to determine the exact position of the carrier, and thus of the items received thereon. In a further method step, the first operating state is then set, in which the compensating device is locked. The movement of the tool is then effected along the predetermined movement path, the measured displacement, or measured displacements, being taken into account in this controlling of the movement device.

According to the disclosure, the method is thus used to first effect a kind of "setting-up" of the manipulator, in which the actual position of the item to be manipulated, or of a carrier/holder carrying it, is sensed and stored in the control unit, such that the deviation between the actual position and the target position is taken into account in the subsequent controlling of the manipulator and thus an exact positioning of the item is ensured.

In the case of an exemplary embodiment of the disclosure, the movement device is designed to be adjustable along up to six first degrees of freedom.

The compensating device may be designed to be adjustable with six second degrees of freedom.

According to the disclosure, it is preferred if the tool flange and the robot flange are resiliently biased in the direction of the zero position in all operating states. Clearly, a different zero position setting is also possible.

The sensing of the relative shift is particularly simple if the manipulator according to the disclosure is embodied with a light means, the illumination state of which is set in dependence on the relative position sensed via the position measuring means.

The light means in this case may be embodied with a plurality of lamps that are controlled in dependence on the relative position.

In the case of an exemplary embodiment of the disclosure, it is provided that the movement of the tool after contacting the item is controlled in dependence on the task to be performed or in dependence on the item. In other words, the amount of relative displacement may vary in dependence on the task/item.

A probe may be used for the setting-up described above, which then, after the actual position has been determined, is exchanged for a tool required to complete the task in question (pick-and-place, painting, welding, etc.).

The position measuring means may be designed in such a manner that both the displacement path and the force required for displacement are sensed optionally or in parallel. In this case, exceeding of the sensing force may indicate, for example, that the tool, or the item to be manipulated, is not in the target position or that it is not being moved along the target movement path.

The manipulator controlled according to the method of the disclosure may be embodied with a plurality of movement devices (articulated-arm robot, Cartesian robot, etc.), each of which is "set-up" in the manner described above.

In the case of an exemplary embodiment of the method according to the disclosure, the item to be manipulated is located on a carrier, for example a pallet, a holder or the like. In principle, a plurality of items may also be held on such a carrier. According to the disclosure, in this case the position of the carrier, and thus its position relative to a target position, can be determined in the manner described above.

In the case a preferred exemplary embodiment, the determination of the relative position according to the disclosure is performed at different regions of the carrier, such that its exact position in space is determined, and then the tool is controlled accordingly, with knowledge this position, to manipulate the item.

BRIEF DESCRIPTION OF THE DRAWINGS

Preferred exemplary embodiments of the disclosure are explained in more detail in the following on the basis of schematic drawings, in which.

DETAILED DESCRIPTION

The disclosure is described below with reference to a manipulator 1, in which an articulated-arm robot 2 is used as the movement device. Clearly, other movement devices, for example Cartesian robots or other handling appliances may also be operated according to the method of the disclosure.

Figure 1:
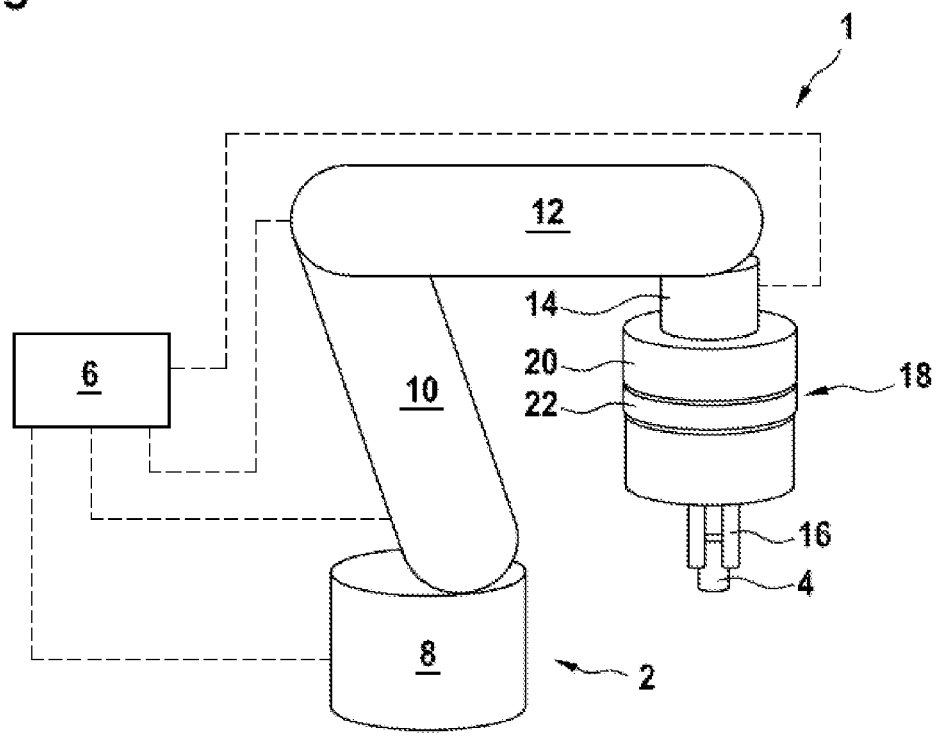
FIG. 1 shows a first exemplary embodiment of a manipulator according to the disclosure comprising an articulated-arm robot.

The manipulator 1, represented in highly schematic form in FIG. 1, has a movement device embodied as an articulated-arm robot 2, via which an item 4 can be manipulated. The articulated-arm robot 2 in this case can be used, for example, to perform a pick-and-place function, a welding operation, a painting operation, a mechanical processing operation or the like. Such articulated-arm robots 2 are known from the prior art, and so there is no need for detailed explanations. The manipulator 1 is controlled via a control unit 6, which has a signal and data connection to actuators and measuring means of the manipulator 1 in order to control them accordingly.

In the case of the exemplary embodiment represented, the articulated-arm robot 2 indicated is embodied as a 6-axis robot, having a robot base 8, two serially arranged jointed arms 10, 12 and a tool arm 14 articulated to the second jointed arm 12, each of which is mounted so as to be pivotable and rotatable about its longitudinal axis. In the interest of simplicity, the respective drive elements and actuators are not represented.

Located at the end portion of the tool arm 14 there is an end effector, the design of which depends on the task. In the case of the exemplary embodiment represented, the end effector is realized as a gripper 16, via which the object 4 to be manipulated can be held, for example in order to perform a pick-and-place task. Located between the gripper 16 and the jointed arm 14 there is a compensating device 18, which in principle may be composed of a robot-side robot flange 20 and a tool flange 22, which are arranged such that they can be shifted relative to each other. The tool flange 22 in this case is designed in such a way that different tools can be mounted, while the robot flange 20 is designed to be attached to the robot, in particular to the respective tool arm 14. As will be described in more detail below, the compensating device 18 is biased, for example via a spring arrangement, into a represented zero position in which the gripper 16 and the compensating device 18, as well as the tool 14, are coaxial with each other. The compensating device 18 is further embodied with a position measuring means, not represented in FIG. 1, via which a relative displacement of the robot flange 20 with respect to the tool flange 22 from the represented zero position can be measured and signalled to the control unit 6.

Figure 2:
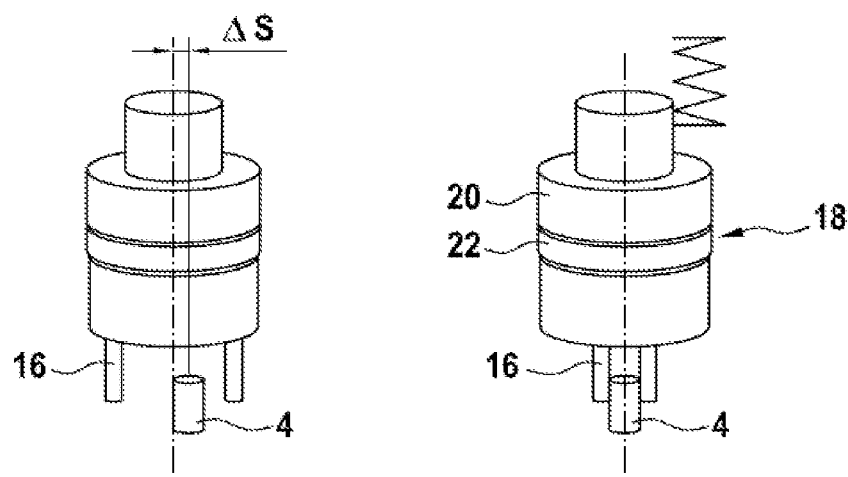
FIG. 2 shows detail representations of the articulated-arm robot during a setting-up operation.
Figure 3:
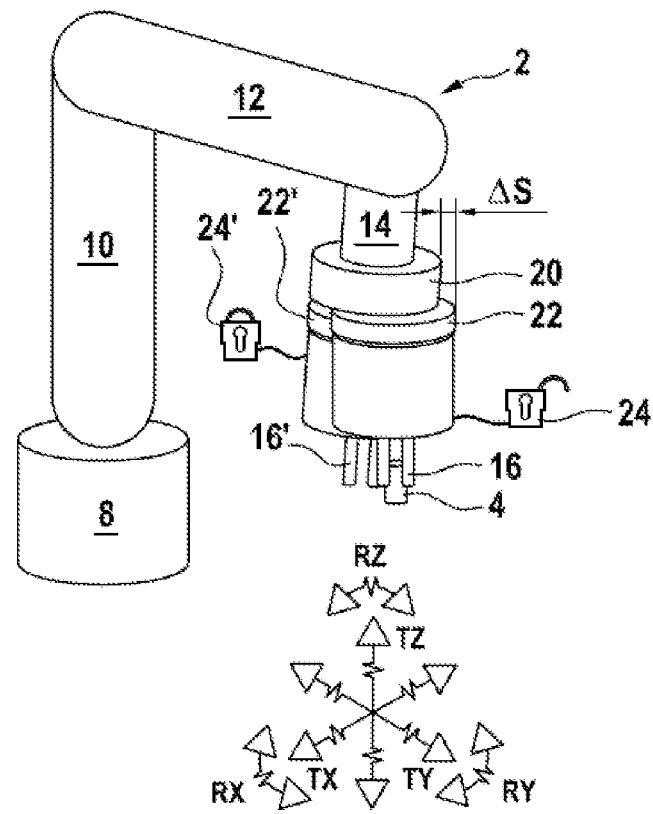
FIG. 3 shows operating states of the manipulator according to FIG. 1 during the (setting-up) method according to the disclosure.

This relative displacement is represented in FIGS. 2 and 3. As embodied above, the robot flange 20 and the tool flange 22 are arranged so as to be self-retaining, for example spring-biased, with respect to each other, but the tool flange 22 can be tilted, rotated or shifted with respect to the robot flange 20. In the case of the exemplary embodiment represented, the compensating device 18 is designed, for example, such that the tool flange 22 can be moved in degrees of freedom of movement that are to be configured in dependence on the respective application. It is thus possible, for example—as represented at the bottom of FIG. 3—to move the tool flange 22 in a translational movement TX, TY and TZ along the X-axis, Y-axis and Z-axis, respectively, and in rotational degrees of freedom RZ, RY, RX about the X-axis, Y-axis and Z-axis, respectively, with respect to the robot flange 20, or the tool arm 14. By means of such a compensating device 18, positional tolerances between a target position and an actual position of the item (workpiece) can be compensated. If such tolerances occur, without such a compensating device 18 it is difficult to grip or deposit the item 4, such that a collision or misplacement may occur instead. The compensating device 18, which is known per se, allows a relative movement between the tool flange 22 and the robot flange 20, such that the tool flange 22 can in particular automatically adjust itself with the tool, in this case the gripper 16, to the position of the item 4 during gripping or depositing.

This is represented by an example in FIG. 2. According to the illustration on the left in FIG. 2, the item 4 is offset from the target position, indicated by a dotted line, by the dimension Δs, such that there is a risk of collision with the item 4 or at least incorrect gripping upon closing of the gripper 16 or as the gripper 16 is being moved. The resilient compensating device 18 makes it possible for the tool flange 22 to be displaced relative to the robot flange 20 during gripping (see right-hand illustration in FIG. 2), such that the gripper 16 can adjust itself to the actual position of the item 4. The offset/displacement between the tool flange 22 and the robot flange 20 then corresponds to the dimension Δs. This displacement is effected in the degrees of freedom of movement that the compensating device 18 allows.

As mentioned above, the compensating device 18 is embodied with a locking mechanism that allows the compensating device 18 to be locked in the zero position, such that the relative movement between the robot flange 20 and the tool flange 22 described above is not possible.

In the case in which there is an incorrect positioning of the item 4, the locking mechanism 24 is first unlocked, as indicated in FIG. 3, such that the relative shift between the robot flange 20 and the tool flange 22 described above is possible in a first operating state. The articulated-arm robot 2 is then controlled via the control unit 6 in such a way that the gripper 16 (or other tool), during its movement toward the target position, comes to bear against the item 4 to be manipulated. The relative displacement by the dimension Δs resulting from the incorrect positioning of the item 4 is then sensed by means of the position measuring means, not represented, and signalled to the control unit 6. Following sensing of this displacement Δs, the gripper 16 is moved back into the position denoted by the reference 16', in which it is only just not touching the item 4. In a subsequent method step, the locking mechanism is then locked (denoted by the reference 24' in FIG. 3), such that the robot flange 20 and the tool flange 22 are locked in the predetermined zero position and precise manipulation of the item 4 is made possible.

In a subsequent method step, the jointed-arm robot 2 is then controlled via the control unit 6 in such a manner that, the predetermined displacement Δs being known, the item 4 can be grasped, for example, and manipulated in the predetermined manner.

This setting-up with the determination of the displacement Δs can also be effected, for example, via a probe, in which case, following determination of the dimension Δs, the probe is exchanged for the respective required tool, for example the gripper 16, such that the latter can be positioned exactly.

Figure 4:
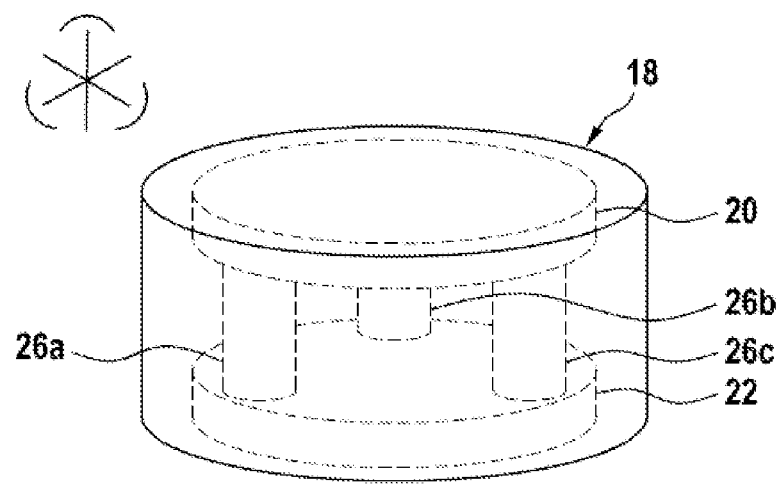
FIG. 4 shows a schematic representation of a compensating device of the manipulator according to FIGS. 1 to 3.

The basic concept of such a compensating device 18 is represented in FIG. 4. Accordingly, in the case of this compensating device 18, as mentioned above, the robot flange 20 is connected to the tool flange 22 (or to components assigned thereto) via indicated joint means 26a, 26b, 26c, which enable the tool flange 22 to be moved according to the degrees of freedom of movement TX, TY, TZ, RX, RY, RZ described above. These joint means 26 may be embodied, for example, as a ball joint arrangement, as explained in the prior art described above, which are biased via a spring arrangement in the direction of the zero position represented in FIG. 4. As the gripper 16 (or other tool) approaches, the tool flange 22 can then be displaced along the described degrees of freedom of movement relative to the robot flange 20 in order to compensate the described positional tolerance and to perform the setting-up operation. This displacement is clearly only possible with the described unlocking. The degree of displacement Δs is determined, as explained, via a position measuring means.

Figure 5:
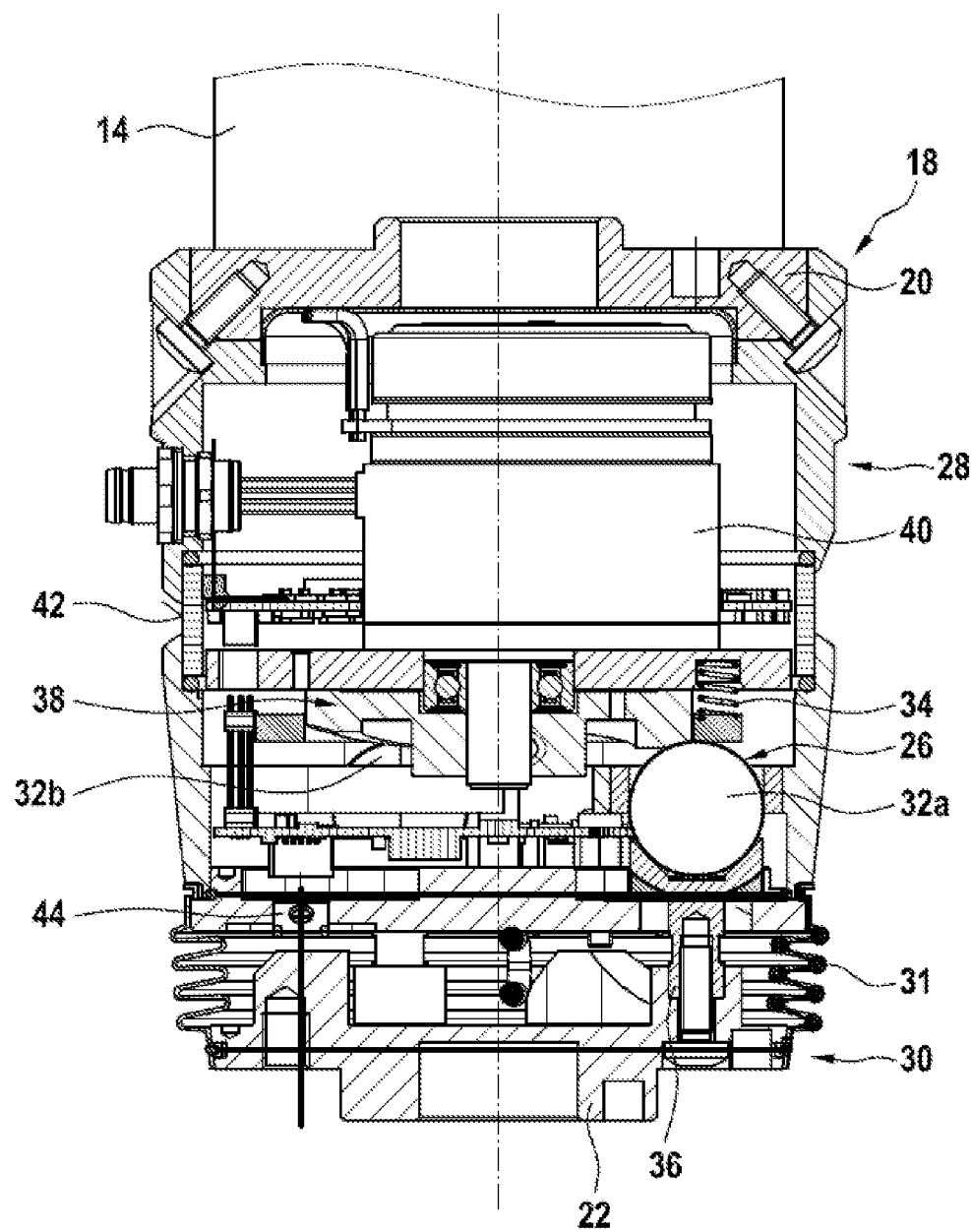
FIG. 5 shows an actual exemplary embodiment of a manipulator according to FIGS. 1 to 4.

FIG. 5 shows an actual exemplary embodiment of such a compensating device 18. It is described in detail in the post-published patent application, such that only the components essential for understanding the disclosure are described here. Accordingly, the compensating device 18 is attached to the tool arm 14 of the articulated-arm robot 2 via the robot flange 20. Fastened to this robot flange 20 is a first assembly 28 of the compensating device 18, which is resiliently connected to the tool flange 22, which is part of a second assembly 30. The structure of these assemblies 28, 30 is explained in the post-published patent application described above. The two assemblies 28, 30 are connected to each other via a bellows 31, such that the interior of the compensating device 18 is covered outwardly, even in the case of larger displacements Δs. As explained with reference to FIG. 4, the first assembly 28 and the second assembly 30, or more precisely the robot flange 20 and the tool flange 22, are connected to each other via joint means 26, which in the case of the exemplary embodiment represented are formed by three balls 32a, 32b, 32c, the third ball not being visible. These balls are adjustably guided in the first assembly 28 (assigned to the robot flange 20) via a spring arrangement 34, the spring bias being designed such that the balls 32 are biased against ball seats 36 supported on the tool flange side.

For the purpose of locking the balls 32 with respect to the ball seats 36, a lock 38 is provided, having an electric motor 40 that can be controlled via the control unit 6 in such a way that the balls 32 are positionally fixed with respect to the respective ball seat 36, such that the first assembly 28 (robot flange 20) and the second assembly 30 (tool flange 22) are positionally fixed in the zero position (see dot-dashed line in FIG. 5).

In the case of exemplary embodiment represented, the respective state of the compensating device 18 (first operating state: locked; second operating state: relative displacement possible) is indicated by a light means 42, arranged on the outer circumference of the first assembly 28 and comprising lamps, the colour and/or structure of which is changed in dependence on the operating state and the relative displacement Δs, such that the setter can very quickly read off the respective operating state from the optical information.

In the case of the exemplary embodiment represented, this relative displacement Δs is sensed by a position sensing means 44, which may be embodied, for example, with a tactile sensor device, it being possible to employ optical sensors or three-dimensional magnetic field sensors or the like. Each of the sensors fastened, for example, to the first assembly 28 is then correspondingly assigned a target area region that is located on the second assembly 30. Depending on the relative positioning of the sensors with respect to the target regions, sensor signals are then correspondingly generated, such that, upon a relative displacement and the associated change in the sensor signals, the degree Δs of the displacement can be determined. These sensor signals are forwarded to an evaluation device integrated into the control unit 6 and evaluated accordingly. The actual structure of such a tactile sensor device is explained in the document DE 10 2015 219 332 A1 mentioned at the outset, such that reference is made to this publication with regard to further details.

Figure 6:
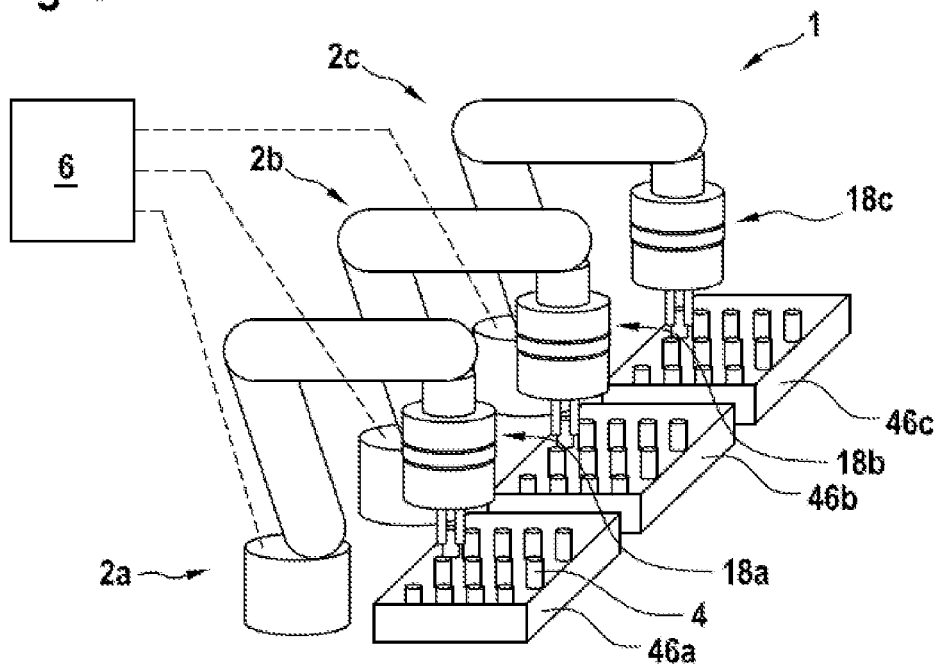
FIG. 6 shows an exemplary embodiment of a manipulator comprising a plurality of movement devices.

In the case of the exemplary embodiment described above, the manipulator 1 is embodied with a single articulated-arm robot 2. FIG. 6 shows a variant in which the manipulator 1 is embodied with three articulated-arm robots 2a, 2b, 2c, each of which is embodied with a compensating device 18a, 18b, 18c as described above. In the case of the exemplary embodiment represented, a multiplicity of items 4 are each located in a pallet 46a, 46b, 46c, each of these pallets 46a, 46b, 46c being assigned to one of the articulated-arm robots 2a, 2b, 2c. The articulated-arm robots 2a, 2b, 2c are controlled via a common control unit 6. In the case of this exemplary embodiment, the setting-up may be effected, for example, with respect to the respective pallets 46a, 46b, 46c, if it can be assumed that the items 4 are precisely positioned within the pallets 46a, 46b, 46c. It is also conceivable in this case that, if the pallets 46a, 46b, 46c are positioned exactly relative to one another, only one setting-up operation is effected, for example by control of the articulated-arm robot 2a in the manner described above, and the displacement of the pallet 46 relative to the target position determined in this process is used to control the articulated-arm robots 2a, 2b, 2c correctly. Clearly, however, an individual setting-up operation for each articulated-arm robot 2a, 2b, 2c is also possible.

Figure 7:
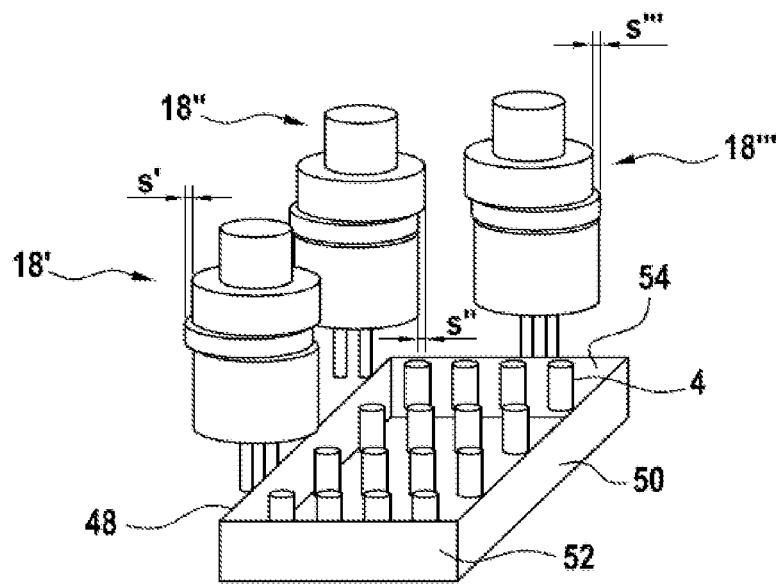
FIG. 7 shows an exemplary embodiment in which the position of a carrier receiving the item to be manipulated is determined.

In a manner similar to the exemplary embodiment described above, in the case of the variant shown in FIG. 7 a multiplicity of items 4 are positioned on a pallet 46 or other carrier. In order to precisely determine the relative position of the pallet 46, it is moved along the circumference or an outer contour several times in the manner described above, the compensating device 18', 18'', 18''' being represented in three such positions in FIG. 7 as an example, such that a multiplicity of relative displacements Δs', Δs'', Δs''' . . . are sensed accordingly. In the case of the exemplary embodiment represented, the pallet is rectangular, such that longitudinal sides 48, 50 and ends 52, 54 can be approached/contacted accordingly in order to sense the exact position of pallet 46. Clearly, this carrier may also be embodied with a different geometry. It is also possible in principle to additionally determine the position of the item or items 4 within the pallet 46, such that, during the manipulation operation, a collision with the pallet 46 or the item 4 due to incorrect positioning is precluded.

To facilitate determination of the relative position, the pallet 46 may also be embodied, for example, with predetermined "setting-up protrusions" which are approached during the setting-up described in order to sense the position of the pallet 46 or carrier.

In the case of the exemplary embodiment described above, the degree of displacement Δs was sensed. It is also possible in principle to use a suitable sensor system to alternatively or additionally sense the force that must be applied for the relative displacement of the tool flange 22 with respect to the robot flange 20, such that this force is also taken into account to prevent damage, in particular in the event of collisions.

Disclosed is a method for operating a manipulator that has a movement device, a compensating device and a tool, a relative displacement of the compensating device with respect to a target position being sensed during setting-up and being taken into account in the subsequent control of the manipulator.

LIST OF REFERENCES 1 manipulator
2 articulated-arm robot
4 item
6 control unit
8 robot base
10 jointed arm
12 jointed arm
14 tool arm
16 gripper
18 compensating device
20 robot flange
22 tool flange
24 lock
26 joint means
28 first assembly
30 second assembly
31 bellows
32 ball
34 spring arrangement
36 ball seat
38 lock
40 electric motor
42 lamp
44 position measuring means
46 pallet
48 longitudinal side
50 longitudinal side
52 end
54 end

What is claimed is:

1. A method for operating a manipulator comprising at least one movement device, a compensating device, and a tool, wherein the manipulator is controlled via a control unit, wherein the compensating device comprises a first part and a second part, wherein the first part is fixedly connected to the at least one movement device, wherein the second part is operatively connected to the tool, wherein the at least one movement device is configured such that the tool alone is movable solely by the at least one movement device in at least two first degrees of freedom, wherein the compensating device is switchable between a first and a second operating state, wherein in the first operating state the first part is substantially rigidly connected to the second part, wherein the first operating state defines a zero position between the first part and the second part, wherein in the second operating state the second part is resiliently connected to the first part in at least two second degrees of freedom, wherein the compensating device is biased in a direction of the zero position, wherein the compensating device has a position measuring device by which a relative position of the second part relative to the first part with respect to the zero position is measured, the method comprising:

setting the second operating state of the compensating device and moving the tool, along a movement path predefined by the control unit using the at least one movement device in a direction of a target position of an item to be manipulated or of a carrier receiving the item to be manipulated, the tool contacting the item to be manipulated in such a manner that the compensating device is displaced out of the zero position;

measuring a relative displacement between the first part and the second part using the position measuring device;

moving the tool using the at least one movement device until the tool no longer touches the item to be manipulated, such that the compensating device is moved back into the zero position;

setting the first operating state of the compensating device; and moving the tool by controlling the at least one movement device based on the measured relative displacement.

2. The method according to claim 1, wherein the at least one movement device and/or the compensating device are adjustable in six first degrees of freedom.

3. The method according to claim 2, wherein the second part is connected to the first part in six second degrees of freedom.

4. The method according to claim 1, wherein a light device defines an illumination state which is set based on the relative position of the first part and the second part sensed via the position measuring device.

5. The method according to claim 4, wherein the light device comprises a plurality of lamps controlled based on the relative position.

6. The method according to claim 1, wherein the movement device is an articulated-arm robot or a Cartesian robot.

7. The method according to claim 1, wherein the movement of the tool is controlled based on the item to be manipulated after the relative displacement has been measured.

8. The method according to claim 1, wherein:
a probe is used for sensing the relative position, and
the probe is exchanged for a gripper for manipulating the item to be manipulated.

9. The method according to claim 1, wherein the position measuring device is configured to sense the relative displacement and/or the force to be overcome for displacement.

10. The method according to claim 1, wherein the at least one movement device includes a plurality of the movement devices, the control of which is effected in dependence on the determination of the relative displacement with respect to one movement device or after the determination of the relative displacements of all the movement devices.

11. The method according to claim 1, wherein:
the first part includes a rotor flange, and
the second part includes a tool flange.

12. The method according to claim 1, wherein:
the item to be manipulated is located on a carrier, and
the relative displacement is determined by a single approach or by multiple approaches at different positions of the carrier.

* * * * *